(No Model.)
C. C. HILL.
MANUFACTURING BARBED FENCE WIRE.
No. 291,903. Patented Jan. 15, 1884.
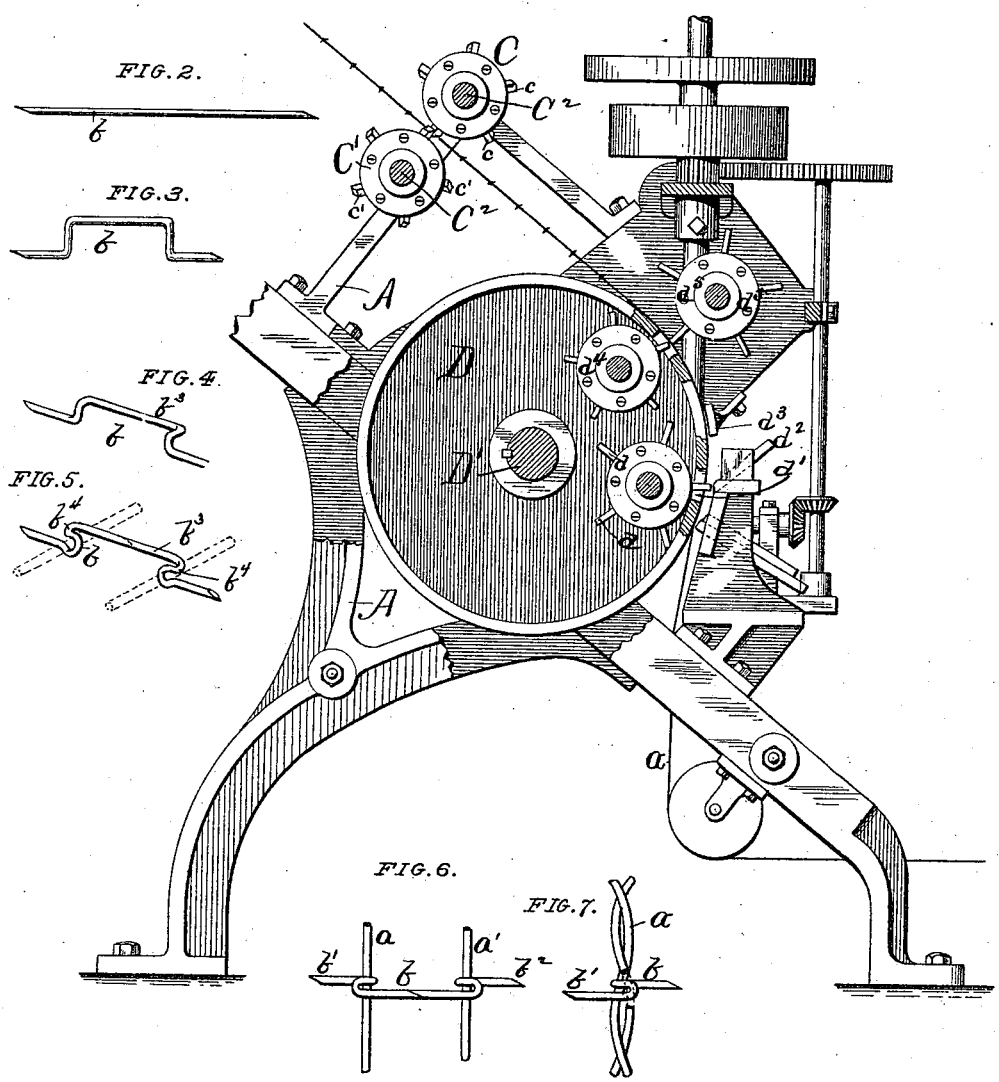
WITNESSES:
INVENTOR:
Christian C. Hill
per Munday, Evarts & Adcock
ATTORNEYS.

UNITED STATES PATENT OFFICE.

CHRISTIAN C. HILL, OF CHICAGO, ILLINOIS.

MANUFACTURING BARBED FENCE-WIRE.

SPECIFICATION forming part of Letters Patent No. 291,803, dated January 15, 1884.

Application filed June 18, 1883. (No model.)

*To all whom it may concern:*

Be it known that I, CHRISTIAN C. HILL, a citizen of the United States, residing in Chicago, in the county of Cook and State of Illinois, have invented new and useful Improvements in Manufacturing Barbed Fence-Wire, of which the following is a specification.

This invention relates to improvements in process and machinery for manufacturing barbed fence-wire.

Heretofore, in the manufacture of barbed fence-wire, the barb-piece has been, by suitable mechanism, secured either to two fence-wires, which are then twisted together into a single cable, or else to a single fence-wire, which is either twisted with another plain wire into a cable, or else used as a single-strand barbed fence-wire. By the present invention, it will be seen, I am enabled to practically double the capacity or amount of barbed wire manufactured by machines intended to secure a barb-piece to two fence-wires without increasing the speed of the machine or materially adding to its mechanism or cost, or the power required to operate it; and to this end my invention consists in first securing a barb-piece of suitable length to form two barbs to each of two fence-wires, and then severing the barb-piece on a diagonal cut at its middle between the two fence-wires, thus forming two separate barbed wires, each of which may be twisted with another plain wire, or used as a single-strand fence, as may be preferred.

Any ordinary barbed-fence machine which secures the barb to each of the two fence-wires may be used in practicing my invention with a little adaptation, the principal change required being simply to separate the two fence-wires farther apart, so as to leave room for two barb-points between them, and to alter the feed of the barb-wire, so as to supply stock sufficient for two barbs, and then to combine therewith suitable mechanism for severing the barb-piece diagonally at its middle between the two fence-wires.

In the accompanying drawings, which form a part of this specification, I have shown a machine or mechanism for securing a single barb-piece to two fence-wires, which may be used in practicing my invention; but as the machine shown forms the subject-matter of a separate application for a patent, which I have made of even date herewith, and as the special form or construction of that machine forms no part of this invention, I shall herein only briefly describe it, or indicate its mode of operation.

In the drawings, Figure 1 is a central longitudinal vertical section of the machine, and showing also, in side elevation, the mechanism with which it is provided for severing the barb-pieces at their middle between the fence-wires; and Figs. 2, 3, 4, 5, and 6 show the successive stages or forms of the barb-piece from the time it is severed from the barb-wire until it is secured to the two fence-wires, and divided at its middle between them. Fig. 7 shows a short piece of the barbed fence-wire after another plain wire has been twisted into a cable with one of the two fence-wires.

In the drawings, $a$ and $a'$ represent the two fence-wires, and $b$ is the barb-piece, which is severed from the barb-wire, of suitable length to form two barbs when secured to the fence-wires $a$ and $a'$, as shown in Fig. 6, by simply severing it diagonally at its middle.

C and C' are a pair of revolving wheels, provided with a series of opposing knives, $c$ and $c'$, in their peripheries, for severing the barb-piece $b$ at its middle, after it has been secured to the two fence-wires $a$ and $a'$. In place of these revolving knives other suitable mechanism may be employed, if preferred.

A is the frame of the machine, upon which the shafts $C^2$ of the wheels C and C' are journaled.

The machine or mechanism for securing the barb-piece $b$ to the wires $a$ and $a'$, as shown in Fig. 6, consists, essentially, of a revolving drum or wheel, D, secured to a shaft, D', journaled on the frame A, and which is provided at its periphery with a series of knives for severing the barb-pieces $b$ from the barb-wire, in connection with an opposing stationary knife on the frame of the machine. The fence-wires $a$ and $a'$ lie parallel to each other and at suitable distances apart on the periphery of the drum. The barb-wire is fed by suitable mechanism across the face of the drum. As the barb-pieces $b$ are severed by the knives from the barb-wire, a series of revolving tools, $d$, inside the drum, projecting through a series of slots, $d'$, therein, bend the barb-piece between a pair of stationary cheeks or jaws outside the drum and concentric therewith, thus giving the barb-piece the form shown in Fig. 3. As the drum continues to revolve, the barb-piece is bent into the form shown in Fig. 4 by a stationary tool, $d^2$, projecting between said concentric cheeks or jaws. The bent middle portion of the barb-piece projects between the two fence-wires as they lie on the drum, and the form shown in Fig. 5 is given to the barb-piece by simply crowding the two fence-wires nearer together by means of a pair of tangentially-mounted rollers, $d^3$. A pair of revolving swages or tools, $d^4$ $d^5$, one journaled inside and one outside the drum, then swage or press the bent middle portion of the barb-piece down flat upon the fence-wires $a$ and $a'$ and securely attach it thereto, after which it is severed at its middle, as shown in Fig. 6, by the revolving knives $c$ $c'$ on the wheels $C$ $C'$. Any suitable gearing or mechanism may be employed for driving the wheels $C$ $C'$ and the different parts of the machine. After the barb-piece $b$ is severed diagonally at its middle each of the barbs $b'$ $b^2$ thus formed will be secured to its fence-wire by a reverse loop, $b^3$, between which and the opposite prong of the barb the fence-wire is embraced. The extremity $b^4$ of the loop $b^3$ should be bent or curved down around the wire sufficiently to lock or hook the barb securely thereon. This may readily be done by giving the swaging-tools $d^4$ $d^5$ the proper-shaped face.

I do not confine myself to the particular method of securing the barb-piece to the two fence-wires, because my invention is equally applicable to any other method of securing the barb-piece to the two fence-wires—as, for example, by simply coiling the barb-piece once or more times around each of the two fence-wires—and for the same reason I do not wish to limit myself to any particular kind of machine or form of mechanism for securing the barb-piece to the fence-wires, nor to any particular mechanism for severing the barb-piece at its middle after it is so secured.

The improved barbed fence-wire herein shown, and formed by cutting the barb-piece diagonally near its middle, as shown, whether used simply or twisted with another plain wire, I do not herein claim, but reserve the same for another application for Letters Patent.

I claim—

1. The improved process or method of manufacturing barbed fence-wire, consisting in first securing a barb-piece of suitable length to form two barbs to each of two fence-wires, and then severing the barb-piece diagonally at its middle between the two fence-wires, thus barbing both wires, substantially as specified.

2. The combination, with mechanism for securing a barb-piece to each of two fence-wires, of mechanism for severing the barb-piece diagonally near its middle between the fence-wires, substantially as specified.

In witness whereof I have hereunto set my hand this 15th day of June, A. D. 1883.

CHRISTIAN C. HILL.

Witnesses:
H. M. MUNDAY,
T. EVERETT BROWN.